United States Patent [19]

Hemenway

[11] 3,857,370

[45] Dec. 31, 1974

[54] ROTARY INTERNAL COMBUSTION ENGINE

[76] Inventor: Wayne A. Hemenway, Rt. No. 4, Edgerton, Wis. 53534

[22] Filed: Aug. 23, 1973

[21] Appl. No.: 391,155

[52] U.S. Cl. .............................. 123/8.33, 123/8.37
[51] Int. Cl. ............................................ F02b 53/06
[58] Field of Search ....... 123/8.33, 8.37, 8.27, 8.31; 418/195, 226, 227

[56] References Cited
UNITED STATES PATENTS

| 1,773,635 | 8/1930 | Simmons | 123/8.33 |
| 3,422,801 | 1/1969 | Mido | 123/8.33 X |

FOREIGN PATENTS OR APPLICATIONS

| 56,385 | 7/1952 | France | 123/8.27 |
| 388,342 | 2/1933 | Great Britain | 123/8.27 |

Primary Examiner—Carlton R. Croyle
Assistant Examiner—Michael Koczo, Jr.
Attorney, Agent, or Firm—Theodore J. Long; John M. Winter; Harry C. Engstrom

[57] ABSTRACT

A rotary engine wherein the engine functions of intake, compression, combustion and exhaust are performed in four separate chambers disposed around the periphery of a cylindrical rotor rotating inside a case. The four chambers are formed by two radially extending pistons on the rotor and an annular disk which rotates around and in synchronism with the rotor. Openings are provided in the disk to allow passage of the rotor pistons through the disk. Fuel and air mixtures provided to the intake chamber are transferred to the compression chamber as the rotor pistons pass through the disk. Compressed fuel and air mixtures are transferred to a storage chamber and then to the combustion chamber for ignition of the mixtures. A reciprocable piston in the storage chamber forces the mixture into the combustion chamber without substantial loss of compression. Products of combustion are transferred from the combustion chamber to the exhaust chamber as the rotor pistons pass through the disk, and are expelled from the contracting exhaust chamber through an exhaust port.

2 Claims, 9 Drawing Figures

3,857,370

ROTARY INTERNAL COMBUSTION ENGINE

BACKGROUND OF THE INVENTION

1. Field of the Invention

This invention pertains generally to rotary internal combustion engines, and more particularly to rotary engines of the type having pistons on a central rotor.

2. Description of the Prior Art

Numerous rotary engines have been developed which perform all of the four basic internal combustion engine functions of intake, compression, combustion and exhaust in a single closed chamber, although the engine may have several of these closed chambers. The functioning of these engines is thus analogous to the standard reciprocating piston engine, with the closed chambers in the rotary engine of this type generally rotating about a central point.

Other rotary engines have been developed in which the closed chambers do not rotate, but the fuel and air mixture taken into the engine is transferred from chamber to chamber wherein the various engine functions are performed. An early example of this type of engine is shown in the patent to Stradovsky, U.S. Pat. No. 1,145,627, which does not, however, perform the function or stroke of compression. The later patent to Simmons, U.S. Pat. No. 1,773,635, discloses a similar engine in which the compression stroke is obtained by pistons which rotate in a closed circular chamber toward a disk, the disk rotating with and around the rotor on which the pistons are mounted. The disk has an opening which allows the rotating pistons to pass through. The fuel and air mixture compressed in the contracting chamber is necessarily stored, and then released in an expanding chamber in which combustion takes place. The successive expansions of the compressed fuel and air mixture required by this design hinder the attainment of adequate compression levels in the combustion chambers.

SUMMARY OF THE INVENTION

Basically, my invention comprises a rotor having radially extending pistons, which rotates within a cylindrical cavity in a case. The open portion of the cavity between the periphery of the rotor and the case is divided into an intake chamber, a compression chamber, a combustion chamber, and an exhaust chamber by the pistons and an abutment disk which rotates around the rotor. The disk has openings in it which allow the pistons to peridocally pass through the disk.

A fuel and air mixture is drawn into the expanding intake chamber, and is transferred to the contracting compression chamber as the pistons pass through the disk. The compressed fuel and air mixture is transferred to a storage chamber in the case by passageways in the rotor and the case which periodically put the compression chamber and storage chamber in open communication. The fuel and air mixture is forced from the storage chamber to the expanding combustion chamber through additional passageways by a reciprocable piston in the storage chamber which is driven by a cam on the rotor shaft. The action of the reciprocable piston in the storage chamber allows the compression of the fuel and air mixture to be maintained or even increased during the transfer from the storage chamber to the combustion chamber. The compressed fuel and air mixture in the combustion chamber is ignited by a spark plug, and the expanding gases exert a force on the piston forming one wall of the combustion chamber, thus producing output torque at the rotor shaft. The products of combustion are transferred to the contracting exhaust chamber when the rotor pistons again pass through the disk, and are expelled through an exhaust pipe which is in communication with the exhaust chamber and the atmosphere. Two combustion strokes occur during each revolution of the rotor.

The disk is driven synchronously with the rotor by a series of gears which transmit power from the rotor shaft to gearing near the periphery of the disk. This method of driving the disk allows more than two rotor pistons to be employed if desired, and consequently more than two combustion strokes per revolution of the rotor.

Further objects, features and advantages of my invention will be apparent from the following detailed description taken in conjunction with the accompanying drawings showing a preferred embodiment of a rotary internal combustion engine exemplifying the principles of my invention.

DESCRIPTION OF THE PREFERRED EMBODIMENT

Figure 1:
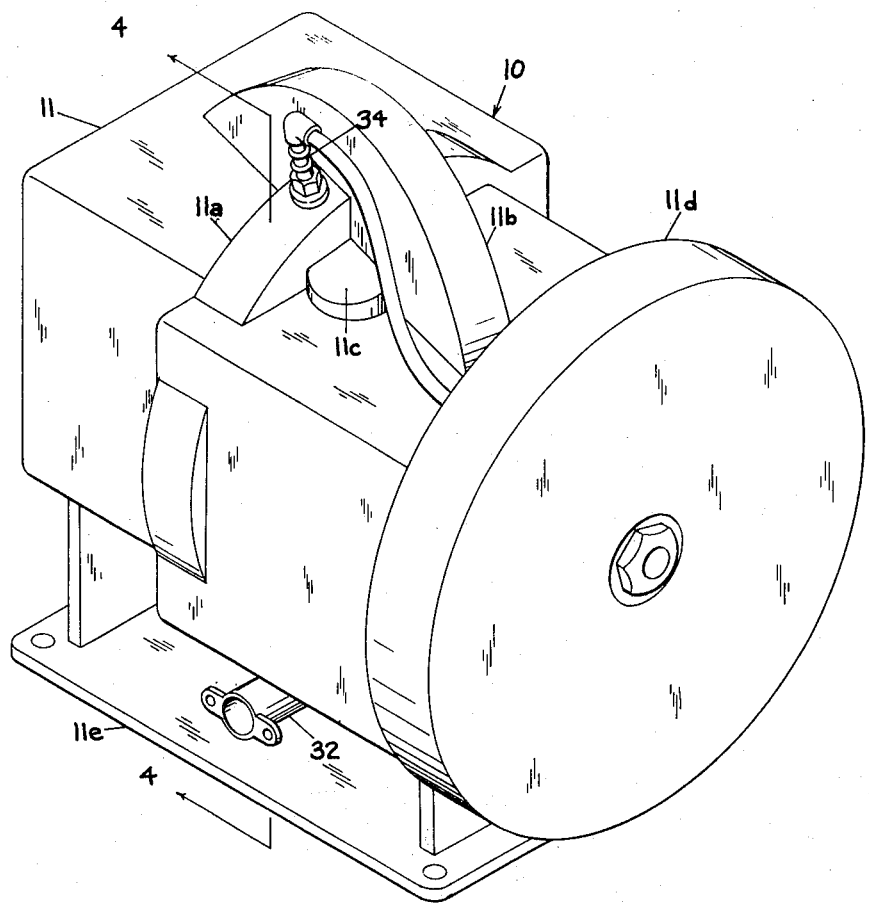
FIG. 1 is a perspective view of the exterior of a rotary engine embodying the principles of my invention.

Referring now more particularly to the drawings wherein like numerals refer to like parts throughout the several views, my rotary internal combustion engine is shown generally at 10 in FIG. 1.

Figure 2:
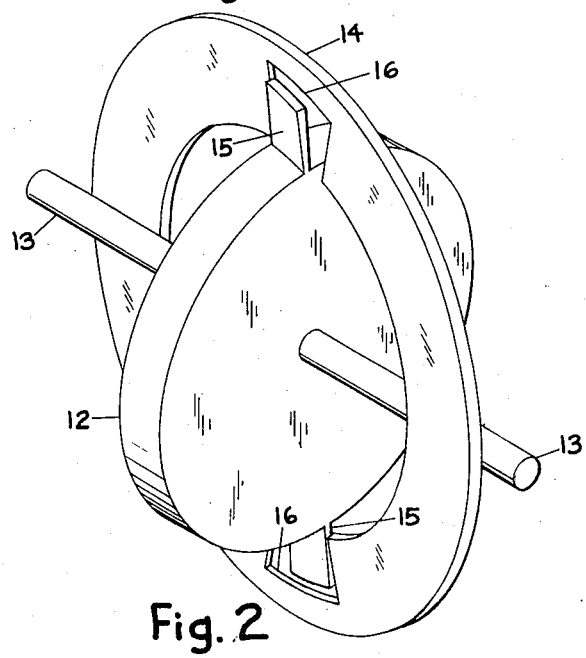
FIG. 2 is a somewhat simplified detail view showing the interaction of the rotor and the abutment disk, with the case of my rotary engine removed.

The rotary engine 10 has a metal case 11 in which a cylindrical rotor 12 rotates on a shaft 13 and an abutment disk 14 rotates around the rotor. A rotor case portion 11a and a disk case portion 11b extend from the central portion of the case 11 to surround the rotor and disk respectively. The interrelation of the rotor 12, and the disk 14 is best shown in FIG. 2, which is a somewhat simplified view of the arrangement of the rotor and disk with the case 11 entirely removed. The disk 14 rotates on an axis of rotation at a substantially transverse angle to the axis of rotation of the rotor 12, the angle between the axes preferably being approximately 75 degrees. The angle between the axes must be less than 90 degrees to allow the disk 14 to clear the rotor shaft 13. The rotor 12 has a pair of radially extending pistons 15 which are affixed to and rotate with the rotor. The disk 14 is annular shaped with the rotor 12 fitting closely within the central opening of the disk. A pair of radially disposed openings 16 are provided in the disk and placed to allow the pistons 15 to pass through the disk as the disk and rotor rotate in synchronism.

Figure 3:
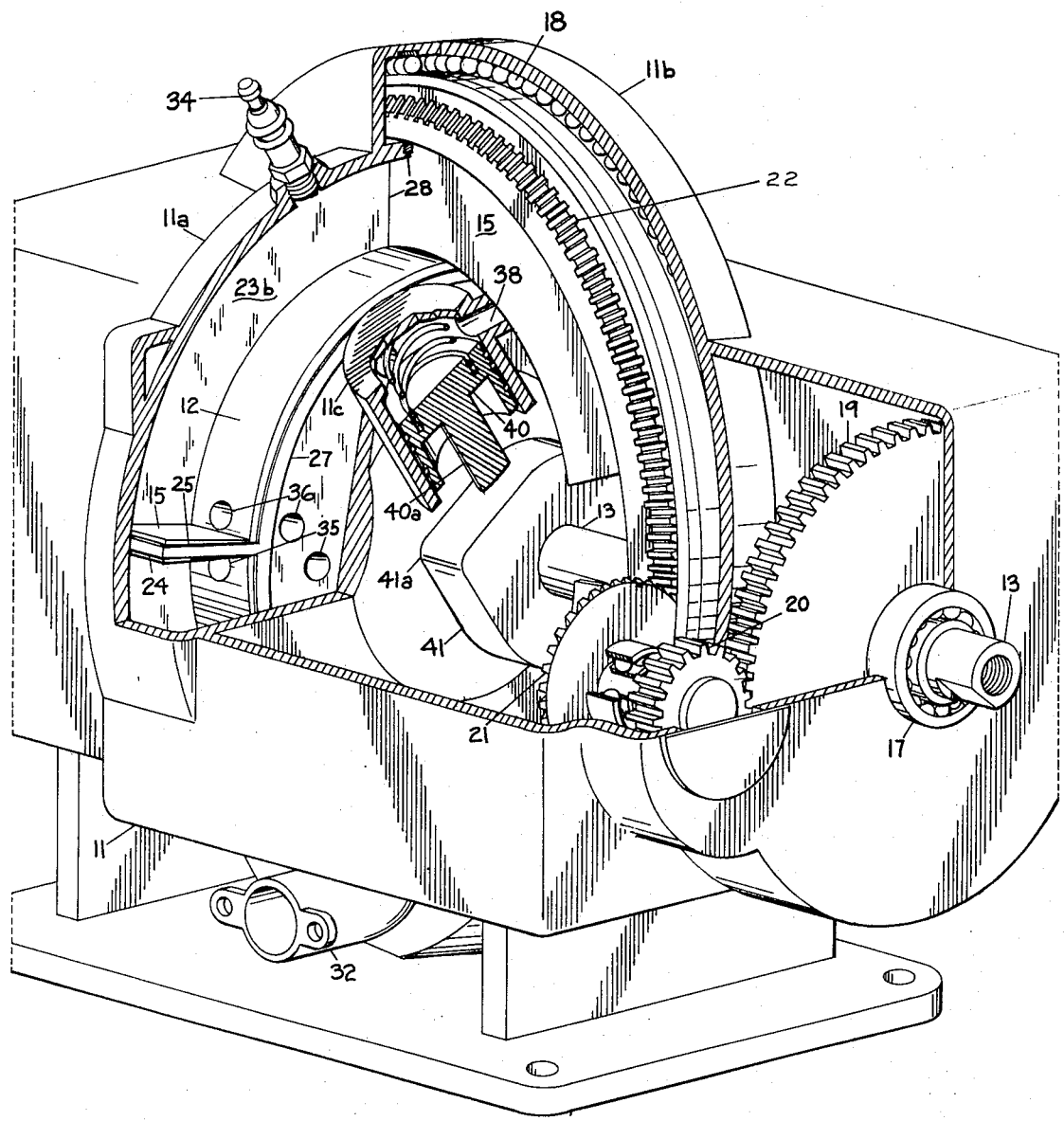
FIG. 3 is a perspective view of my rotary engine with portions of the engine broken away.

As best shown in FIG. 3, the rotor shaft 13 is journaled to the case 11 by bearings 17 which are positioned near the ends of the shaft 13. The disk 14 is rotatably mounted in the case 11 by bearings 18 which are positioned on the periphery of the disk. The rotation of the rotor is transmitted to the disk by means of a rotor shaft gear 19, an idler gear 20 engaged with the rotor shaft gear, an idler bevel gear 21 engaged with the idler gear, and disk bevel gearing 22 which extends around the entire circumference of the disk and is engaged with the idler bevel gear 21. Thus the disk will be driven in close sychronism with the rotor.

Figure 4:
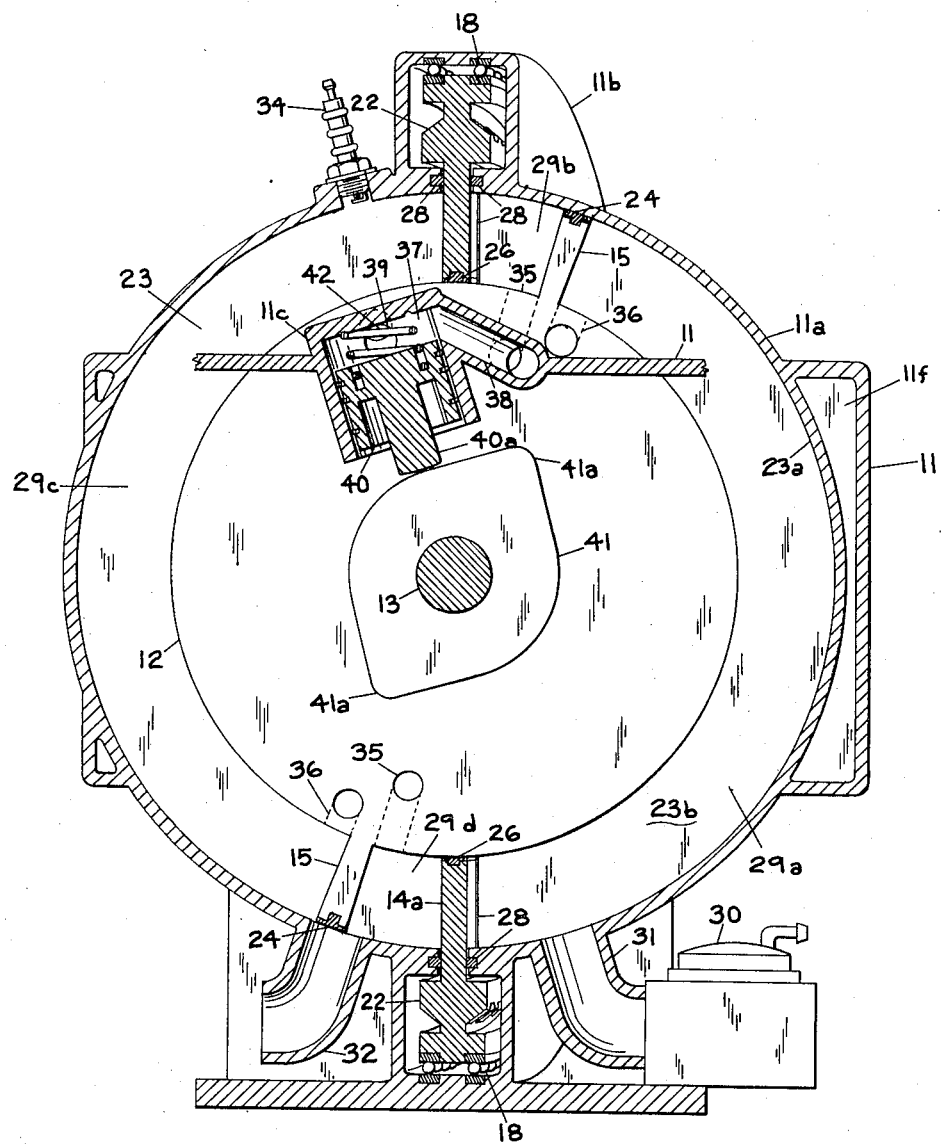
FIG. 4 is a cross-sectional view taken along the line 4—4 of FIG. 1 with a detailed view of a portion of a storage chamber superimposed thereon.

The rotor 12 is rotatably mounted within and is in slidable sealing engagement with a cylindrical cavity 23 in the case 11. The pistons 15 extend from the periphery of the rotor 12 to the interior peripheral wall 23a of the cavity 23, and are sealed against the wall 23a by a seal 24 on the end of each piston. The sides of the pistons 15 are slidably sealed against the side walls 23b of the cavity 23 by piston side seals 25. The inner periphery of the disk 14 is slidably sealed against the rotor by inner seals 26 which extend along the entire inner periphery of the disk except where the openings 16 are located. Rotor side seals 27 mounted on the rotor 12 slidably seal the rotor against the side walls of the cavity 23, and disk containment seals 28 mounted in the case 11 seal the disk against the peripheral wall 23a and the side walls 23b of the cavity. All of the mentioned seals are constructed to be substantially air tight, and thus the annular shaped open portion of the cavity 23 between the rotor periphery and the cavity wall 23a is divided into four airtight chambers when the disk 14 is blocking that open portion of the cavity. As shown in FIG. 4, an expanding chamber 29a is formed between the portion 14a of the disk 14 blocking the bottom of the cavity 23 and the piston 15 which is rotating away from it in a counterclockwise direction. A contracting chamber 29b is formed between the portion 14b of the disk 14 blocking the top of the cavity 23 and the piston 15 which is rotating toward it, while another expanding chamber 29c is formed between the disk portion 14b and the piston 15 which is rotating away from it. Another contracting chamber 29d is formed between the disk portion 14a and the piston 15 which is rotating toward it. It is apparent that only two airtight chambers are formed when the disk openings 16 begin to align with the open portion of the cavity 23 to allow the pistons 15 to pass through the disk.

A commercially available carburetor 30 provides a fuel and air mixture which is drawn by the vacuum formed in the expanding chamber 29a through an intake pipe 31 into the chamber 29a. The chamber 29a thus serves as an intake chamber for a fuel and air mixture. Products of combustion are expelled out of the contracting exhaust chamber 29d through an exhaust pipe 32 which is in open communication with the exhaust chamber and with the atmosphere.

A flywheel (not shown) is mounted on the rotor shaft 13 and provides sufficient rotational inertia to insure smooth rotational motion. A flywheel case 11d surrounds and protects the flywheel.

A standard spark plug 34 is connected by a wire to any suitable electrical ignition system to provide a means for igniting a compressed fuel and air mixture in the expanding chamber 29c, in which the combustion of the engine occurs.

As best shown in FIG. 4, a first pair of passageways 35 are formed in the rotor 12, one passageway 35 being located rotationally ahead of each piston 15. Each passageway 35 has one opening on the periphery of the rotor 12, in communication with the open portion of the cavity 23, which is located slightly ahead of its associated piston 15. The other opening of each passageway 35 is on the flat side of the rotor 12 and is normally slidably closed by the walls of the case 11 which surround the rotor. A second pair of passageways 36 are formed in the rotor 12 rotationally behind each of the pistons 15. These second rotor passageways 36 each have one opening on the periphery of the rotor 12, in communication with the open portion of the cavity 23, which is located slightly behind its associated piston 15. The other openings of the second rotor passageways 36 are on the flat side of the rotor 12 and are normally slidably closed by the walls of the case 11.

A substantially cylindrical storage chamber 37 is formed in a storage chamber case 11c which is part of the case 11, as best shown in FIG. 4, wherein the storage chamber 37 is shown superimposed on a section of the engine 10. A first passageway 38 in the case 11 has one end in communication with the storage chamber 37 and a second end which is normally slidably closed by the flat side of the rotor. A second passageway 39 in the case 11 also has one end in communication with the storage chamber 37 and a second end which is normally slidably closed by the flat side of the rotor. The openings in the passageways 38 and 39 which are normally closed by the rotor are located so that the opening of the first case passageway 38 will periodically align and be in communication with the openings of the first rotor passageways 35, and the opening of the second case passageway 39 will periodically align and be in communication with the openings of the second rotor passageways 36 with rotation of the rotor. A reciprocable piston 40 fits within the storage chamber 37 and is in slidable sealing engagement with the curved walls of the chamber to make the chamber substantially air tight. The piston 40 is moved inwardly within the storage chamber 37 by a cam follower portion 40a of the piston which rides on a cam 41 fixed to the rotor shaft 13. The two lobes 41a of the cam 41 are positioned to force the piston 40 inwardly when the openings of the rotor passageways 36 align with the opening of the case passageway 39. A spring 42 provides an outward force on the piston 40 to generally maintain the cam follower 40a in contact with the cam 41.

Figure 5:
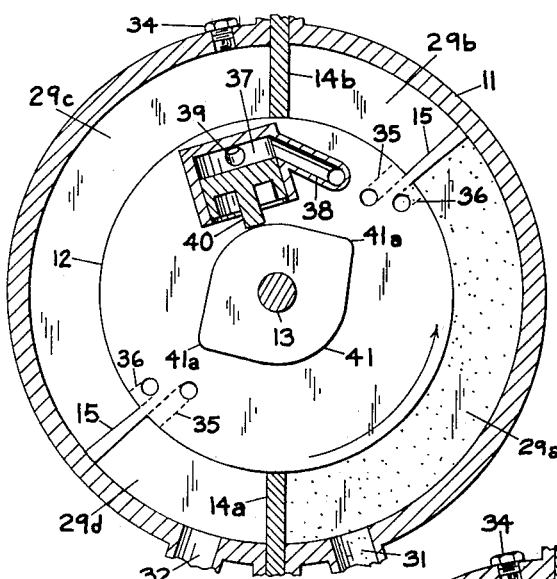
FIGS. 5–9 are diagramatic illustrations showing the interaction of the intake, compression, combustion and exhaust chambers with each other and with the storage chamber during one engine cycle.
Figure 6:
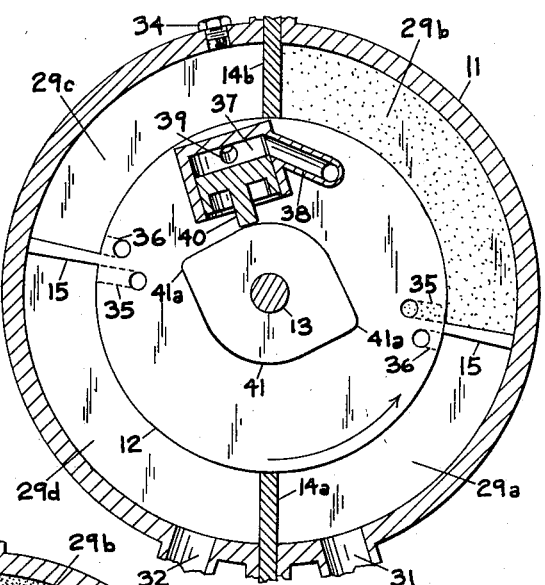
Figure 7:
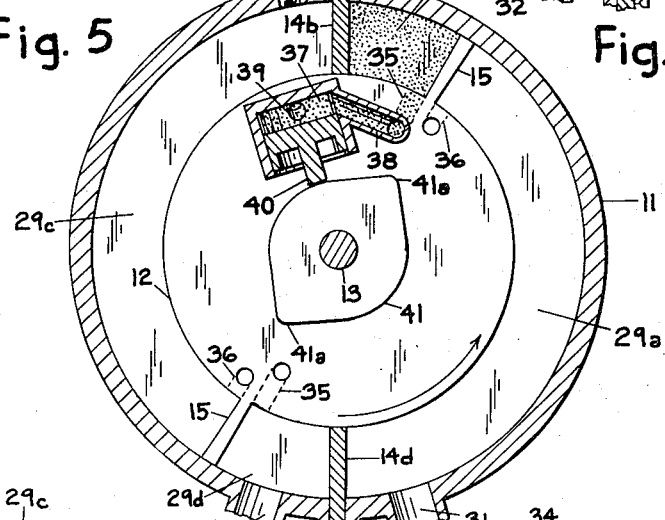
Figure 8:
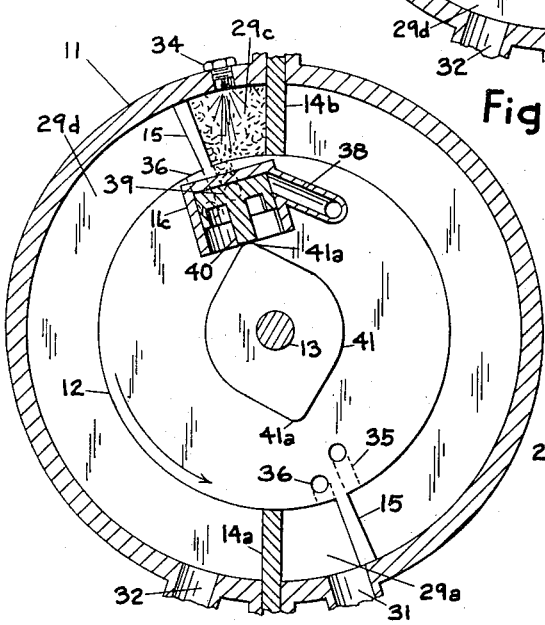

FIGS. 5–9 diagramatically illustrate the four functions of intake, compression, combustion, and exhaust as performed in my rotary engine, wherein the rotor 12 as shown by the arrows is rotating in a counterclockwise direction. In FIG. 5 the expanding intake chamber 29a is shown drawing in fuel and air mixture through the intake pipe 31. As the pistons 15 pass through the openings 16 in the disk 14, and the disk recloses, the fuel and air mixture becomes enclosed in the contracting compression chamber 29b. As the piston 15 moves toward the disk portion 14b the fuel and air mixture therein is compressed, as shown in FIG. 6. Just prior to the opening of the disc portion 14b, the normally closed opening of the rotor passageway 35 aligns with the normally closed opening of the case passageway 38. As shown in FIG. 7, a first transfer takes place as a substantial portion of the compressed fuel and air mixture in the compression chamber 29b is transferred by expansion through the passageways 35 and 38 to the storage chamber 37. Continued rotation of the rotor 12 closes the openings in passageways 35 and 38, and the pistons 15 again pass through the openings 16 in the disk 14, and the disk recloses. As shown in FIG. 8, when the normally closed opening in the rotor passageway 36 aligns with the normally closed opening in the case passageway 39, a second transfer takes place as the lobe 41a of the cam 41 forces the reciprocable piston 40 inward in the storage chamber 37, and thus forces the compressed fuel and air mixture into the expanding combustion chamber 29c. Because the fuel and air mixture is forced from the storage chamber into the combustion chamber 29c, which is of substantially the same volume as the storage chamber at the time of transfer, the action of the reciprocable piston 40 driven by the cam 41 and the spring 42 provides a means for maintaining the compression of the fuel and air mixture during the transfer. If desired, the volume of the storage chamber 37 may be selected so that an increase in compression is obtained.

At an appropriate time after the compressed fuel and air mixture is transferred to the combustion chamber 29c, the spark plug 34 is fired to ignite the mixture. The burning gases expand between the disk portion 14b and the piston 15, with the force applied to the piston resulting in output torque at the rotor shaft 13.

Figure 9:
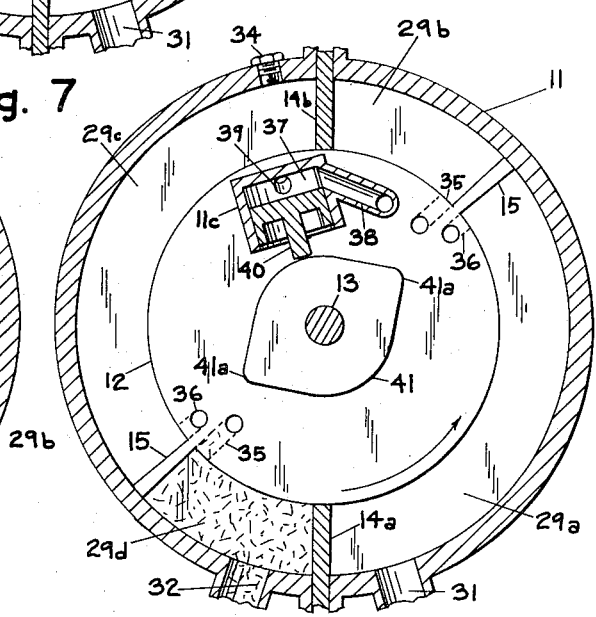

As the pistons 15 again pass through the disk 14 and the disk recloses, the products of combustion are transferred to the contracting exhaust chamber 29d. As shown in FIG. 9, the rotation of the piston 15 toward the disk portion 14a forces the products of combustion out of the exhaust chamber 29d through the exhaust pipe 32 to the atmosphere outside the engine 10.

Although the description above has traced the intake, compression, combustion and exhaust strokes of my rotary engine 10 sequentially for a single mixture of fuel and air, these four functions are taking place simultaneously in the four closed chambers of the engine. This allows a combustion stroke each time a piston 15 passes the spark plug 34, which thus provides two combustion strokes for each revolution of the rotor 12.

Although my rotary internal combustion engine has been shown and described as using two radially extending pistons 15 on the rotor, it is apparent that three or more pistons could be employed to achieve more combustion strokes per rotor revolution. If an odd number of pistons is used, the disk will require only one opening to allow passage of the pistons, and the disk will necessarily rotate at a higher speed than the rotor. Increasing the disk speed is accomplished by changing the gear ratio of the gears which drive the disk. Increasing the number of pistons will not affect the number of intake, compression, combustion and exhaust chambers, since these chambers are formed adjacent to the abutment disk 14.

It is understood that my invention is not confined to the particular construction of parts herein illustrated and described for exemplification, but embraces all such modified forms thereof as come within the scope of the following claims.

I claim:

1. A rotary internal combustion engine comprising:

a. a case having a substantially cylindrical cavity and a storage chamber therein;

b. a substantially cylindrical rotor rotatably mounted within said cavity, said rotor having a plurality of radially extending pistons thereon;

c. an annular abutment disk rotatably mounted within said case on an axis of rotation substantially transverse to the axis of rotation of said rotor, said disk having a central opening within which said rotor fits and at least one opening radially disposed from said central opening to allow the passage of said pistons through said disk as said rotor rotates;

d. means for synchronously transmitting the rotation of said rotor to said disk;

e. said rotor and pistons thereon and said disk being in slidable sealing engagement with the walls defining said cylindrical cavity to form an expanding intake chamber, a contracting compression chamber, an expanding combustion chamber, and a contracting exhaust chamber when said disk is blocking said cylindrical cavity;

f. means for supplying a fuel and air mixture to said intake chamber, said fuel and air mixture being transferred to said compression chamber for compression therein upon passage of said pistons through said disk;

g. a plurality of passageways in said rotor, one passageway for each of said pistons, each of said passageways having one end which is located rotationally ahead of the one of said pistons and is in communication with said cylindrical cavity, the other end of each of said rotor passageways being normally closed by said case;

h. a passageway in said case having one end in communication with said storage chamber, and a second end which is normally closed by said rotor but is periodically in communication with the ends of said rotor passageways as said rotor rotates to thereby transfer the compressed fuel and air mixture from said compression chamber to said storage chamber;

i. transfer means for transferring the compressed fuel and air mixture from said storage chamber to said combustion chamber including means for substantially maintaining the compression of the fuel and air mixture during transfer from said storage chamber to said combustion chamber;

j. means for igniting the compressed fuel and air mixture in said combustion chamber, the products of combustion therefrom being transferred to said exhaust chamber upon passage of said pistons through said disk; and k. means for exhausting said products of combustion from said exhaust chamber.

2. A rotary internal combustion engine comprising:

a. a case having a substantially cylindrical cavity and a storage chamber therein;

b. a substantially cylindrical rotor rotatably mounted within said cavity, said rotor having a plurality of radially extending pistons thereon;

c. an annular abutment disk rotatably mounted within said case on an axis of rotation substantially transverse to the axis of rotation of said rotor, said disk having a central opening within which said rotor fits and at least one opening radially disposed from said central opening to allow the passage of said pistons through said disk as said rotor rotates;

d. means for synchronously transmitting the rotation of said rotor to said disk;
e. said rotor and pistons thereon and said disk being in slidable sealing engagement with the walls defining said cylindrical cavity to form an expanding intake chamber, a contracting compression chamber, an expanding combustion chamber, and a contracting exhaust chamber when said disk is blocking said cylindrical cavity;
f. means for supplying a fuel and air mixture to said intake chamber, said fuel and air mixture being transferred to said compression chamber for compression therein upon passage of said pistons through said disk;
g. first transfer means for transferring the compressed fuel and air mixture from said compression chamber to said storage chamber;
h. a plurality of passageways in said rotor, one passageway for each of said pistons, each of said passageways having one end which is located rotationally behind one of said pistons and which is in communication with said cylindrical cavity, the other end of each of said rotor passageways being normally closed by said case;
i. a passageway in said case having one end in communication with said storage chamber, and a second end which is normally closed by said rotor but is periodically in communication with the ends of said rotor passageways as said rotor rotates;
j. a reciprocable piston within said storage chamber;

k. cam and spring means for moving said piston outwardly within said storage chamber to allow said compressed fuel and air mixture to be transferred from said compression chamber to said storage chamber and for moving said piston inwardly within said storage chamber when said passageway in said case is in communication with one of said rotor passageways for transferring said compressed fuel and air mixture to said combustion chamber;

l. means for igniting the compressed fuel and air mixture in said combustion chamber, the products of combustion therefrom being transferred to said exhaust chamber upon passage of said pistons through said disk; and
m. means for exhausting said products of combustion from said exhaust chamber.

* * * * *